(12) United States Patent
Kussman et al.

(10) Patent No.: US 11,209,347 B2
(45) Date of Patent: Dec. 28, 2021

(54) OPTICAL MEASUREMENT APPARATUS

(71) Applicant: HACH LANGE GMBH, Berlin (DE)

(72) Inventors: Michael Kussman, Dusseldorf (DE); Aurelia Stellmach, Wulfrath (DE); Markus Hahn, Kempen (DE); Markus Lenhard, Viersen (DE); Sebastian Minke, Krefeld (DE); Andreas Jonak, Meerbusch (DE); Volker Baar, Kaarst (DE); Heinz Rudde, Huckelhoven (DE)

(73) Assignee: HACH LANGE GMBH, Berlin (DE)

( * ) Notice: Subject to any disclaimer, the term of this patent is extended or adjusted under 35 U.S.C. 154(b) by 523 days.

(21) Appl. No.: 16/319,036

(22) PCT Filed: Jul. 20, 2016

(86) PCT No.: PCT/EP2016/067229
§ 371 (c)(1),
(2) Date: Jan. 18, 2019

(87) PCT Pub. No.: WO2018/014946
PCT Pub. Date: Jan. 25, 2018

(65) Prior Publication Data
US 2021/0325298 A1  Oct. 21, 2021

(51) Int. Cl.
*G01N 21/00* (2006.01)
*G01N 21/15* (2006.01)
*G01N 21/51* (2006.01)

(52) U.S. Cl.
CPC ............. *G01N 21/15* (2013.01); *G01N 21/51* (2013.01); *G01N 2021/151* (2013.01)

(58) Field of Classification Search
CPC ............... G01N 21/53; G01N 15/0205; G01N 15/1459; G01N 21/51; G01N 15/1434

USPC ........................................................... 356/338
See application file for complete search history.

(56) References Cited

U.S. PATENT DOCUMENTS

| 3,078,766 A | 2/1963 | Barton, Jr. et al. |
| 3,144,949 A | 8/1964 | Ginsburgh |
| 5,446,544 A | 8/1995 | Beers |
| 2013/0277008 A1 | 10/2013 | Ishikura et al. |

FOREIGN PATENT DOCUMENTS

| WO | 2008087648 | 7/2008 |
| WO | 2016079259 | 5/2016 |

OTHER PUBLICATIONS

International Searching Authority, Notification of Transmittal of the International Search Report and the Written Opinion of the International Searching Authority, or the Declaration, dated Apr. 11, 2017, p. 12.

*Primary Examiner* — Md M Rahman

(57) ABSTRACT

The invention refers to an optical measurement apparatus (10) with an optical device (18,20,22) and a liquid sample vessel (12) for measuring an optical parameter of a liquid sample (13) in the liquid sample vessel (12), comprising a drying circuit circulating drying air for venting the sample vessel (12), wherein the drying circuit comprises a mechanical water stop means (100) in the course of the drying circuit, the water stop means (100) comprising a conduit body (102) with a water-absorbing swelling element (120) arranged within the conduit body (102). The water stop means is simple and inexpensive and reliably protects all elements downstream of the water stop means from a water ingress upstream of the water stop means.

13 Claims, 3 Drawing Sheets

OPTICAL MEASUREMENT APPARATUS

Figure 1:
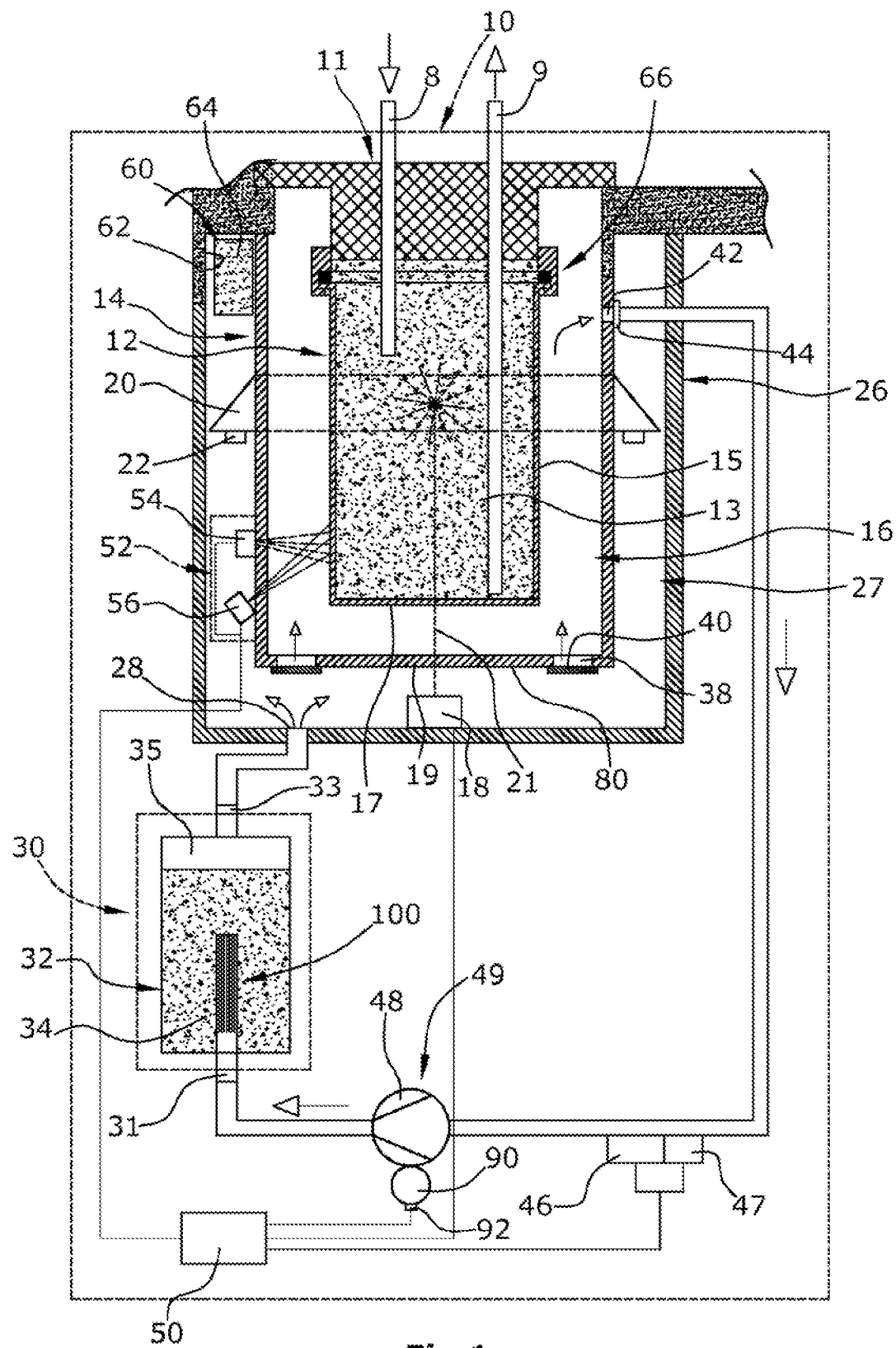

The invention refers to an optical measurement apparatus with an optical device for measuring an optical parameter of a liquid sample in a liquid sample vessel. The invention preferably refers to a nephelometric turbidimeter for measuring the turbidity of the liquid sample.

Optical devices are sensitive for condensation of humidity at the optical elements or at the transparent sample vessel. WO 2016 079 259 A1 discloses an optical measurement apparatus which is a nephelometric turbidimeter and comprises a drying circuit circulating drying air for venting the outside surfaces of the sample vessel to avoid any condensation at the sample vessel. The sample vessel is provided in a vessel chamber which is arranged within an optics chamber. The drying air is pumped into the optics chamber, from the optics chamber directly into the sample chamber and from the sample chamber to a gas pump followed by a drying body comprising a drying substance. The drying air flows from the drying body again into the optics chamber.

The optical measurement apparatus is realized as and working as a process device so that the sample liquid continuously flows through the sample vessel between a sample inlet and a sample outlet of the sample vessel. The sample liquid is pumped through the sample vessel with an overpressure of up to 2-5 bar. If the hydraulic arrangement within the vessel chamber becomes leaky or becomes damaged, the pressurized sample liquid flows into the vessel chamber and is sucked by the drying gas pump from the vessel chamber via the gas pump and the drying body to the optics chamber so that the optics chamber is flooded and the electronic and optic elements are spoiled or destroyed.

It is an object of the invention to provide an optical measurement apparatus with a drying circuit with an improved protection against liquid leakage of the hydraulic system.

This object is achieved with an optical measurement apparatus with the features of main claim 1.

The optical measurement apparatus according to the invention is provided with a mechanical water stop means in the course of the drying air circuit and fluidically between the drying gas outlet and inlet of the vessel chamber, preferably between the vessel chamber and the optics chamber. The water stop means comprises a tube-like conduit body with a water-absorbing swelling element arranged within the conduit body. The swelling element is preferably defined by a super absorbent material, which more preferably is a super absorbent polymer, for example spun super absorbent 'Ultrablock S' of Coats plc, UK.

The water-absorbing swelling element within the conduit body blocks, under dry conditions, only a fraction of the cross sectional area of the conduit body so that the flow resistance under dry conditions is not relevant, and is in the range of less than 15 mbar, as a tests have shown. As soon as water arrives at the water stop means, the water-absorbing swelling element dramatically and quickly expands by absorbing water and thereby increases its volume by a factor of 2 to 20. Tests have shown that the blocking effect becomes effective after a few seconds, only, after the water has arrived at the water stop means.

The purely mechanical water stop means is highly reliable, has a relatively short reaction time, can not be released unintentionally after being activated and is mechanically simple and therefore highly cost-effective.

According to a preferred embodiment, the swelling element comprises swelling filaments consisting of or coated with a super absorbent material.

The swelling element is not a single block or piece but is consisting of a bunch of filaments. As a consequence, the total surface of the swelling element is very high so that the swelling ratio after water has been arrived at the water stop means is very high. As a result, the total volume of the water-absorbing swelling element increases dramatically under water contact so that the conduit body is completely blocked by the swelling element after a few seconds, at most.

According to a preferred embodiment, the water stop conduit body is provided with an air inlet and an air outlet defining a general flow direction of the drying air through the conduit body. The swelling filaments are fixed with their first filament ends at the conduit body so that the filaments extend with their non-fixed second filament ends in upstream direction against the general flow direction. The bundle or bunch of filaments is more or less axially aligned within the conduit body and the free filament ends are facing towards the incoming gas/air flow.

The filaments have a particular stiffness so that the swelling filaments are not significantly deformed by the flow of the drying air. As soon as the water arrives at the swelling element, the filaments dramatically expand, are deformed and thereby are tangled and compressed to become a plug which finally is compressed in the conduit body to completely block it.

The conduit body preferably is not necessarily completely stiff but is strong and stiff enough to be unbroken by the expanding swelling element.

According to a preferred embodiment, the water stop conduit body is a cylindrical tube and the dry swelling filaments are orientated longitudinally within the cylindrical tube.

Preferably the total cross-sectional area of all dry swelling filaments covers at least 10% and preferably at least 20% of the total cross-sectional area of the conduit body. Tests have shown that a coverage of less than 30 to 40% of the total cross-sectional area of the cylindrical cube causes no relevant flow resistance for the drying air if the total cross-sectional area is large enough. The higher the coverage is, the quicker the swelling element blocks the conduit body after water has arrived at the water stop means.

According to a preferred embodiment the drying circuit comprises a disposable drying cartridge with a cartridge housing, a drying substance within the cartridge housing, fluidic coupling elements for coupling the drying cartridge to the optical measurement apparatus and a water stop means. In one embodiment the water stop means may be integrated into the drying cartridge. In another embodiment the water stop means may be integrated into the drying circuit yet physically separate from the drying cartridge.

After the water stop means has been activated and has closed and blocked the drying circuit, the water stop means can simply be substituted by replacing the used drying cartridge with a new drying cartridge. As a result, no relevant efforts are needed for replacing the activated water stop means.

Preferably, the drying circuit comprises an electric drying gas pump comprising an electric pump motor, a motor current sensor sensing the electric current of the pump motor and a controller device being connected with the motor current sensor. The control device sends a water stop signal if the sensed motor current IM exceeds a set current value IS. No extra sensors are needed to provide a water accident signal.

According to a preferred embodiment, the liquid sample vessel is a transparent cuvette and is provided with a sample inlet and a sample outlet. The optical measurement apparatus therefore is a so-called process device for continuous or quasi-continuous measurement of an optical parameter of the liquid sample.

Preferably, the optical device comprises a light source and a light detector for detecting transmission, absorption, turbidity or another optical parameter of the liquid sample. More preferably, the optical measurement apparatus is a nephelometric turbidimeter for measuring the turbidity of the liquid sample.

Figure 2:
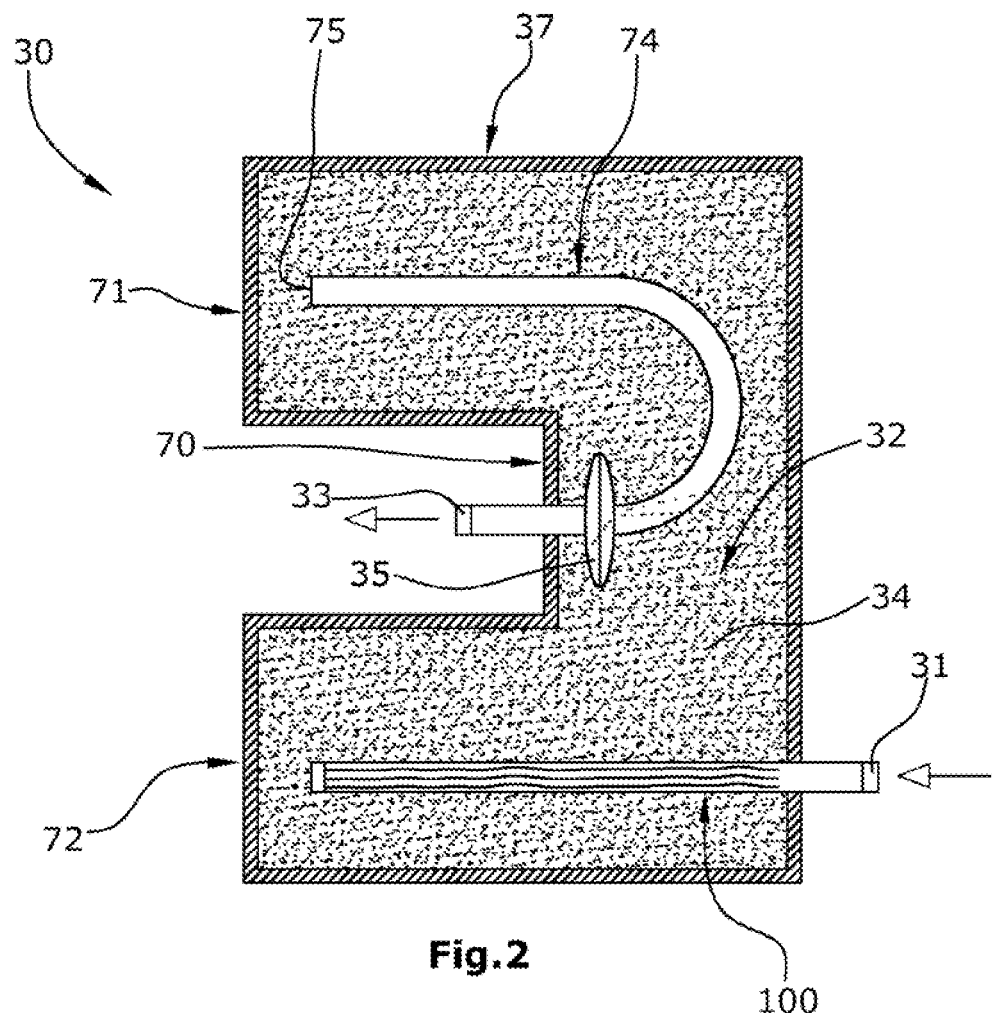
Figure 3:
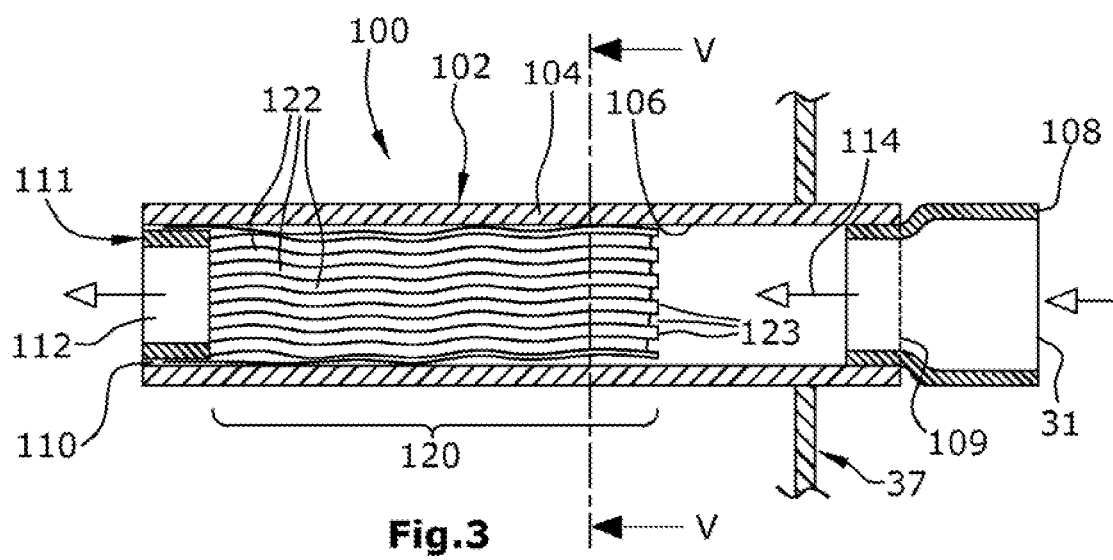
Figure 4:
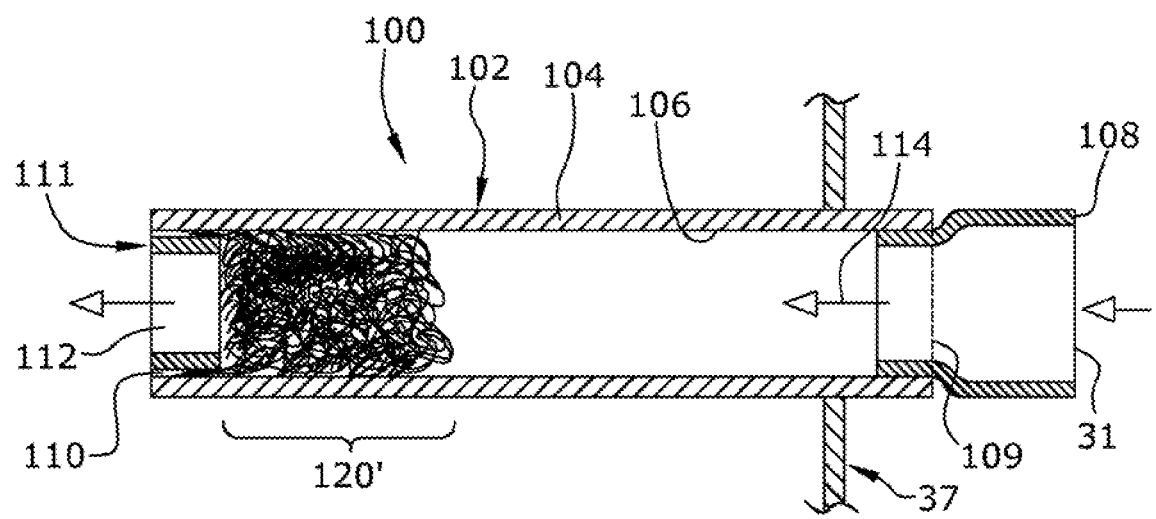
Figure 5:
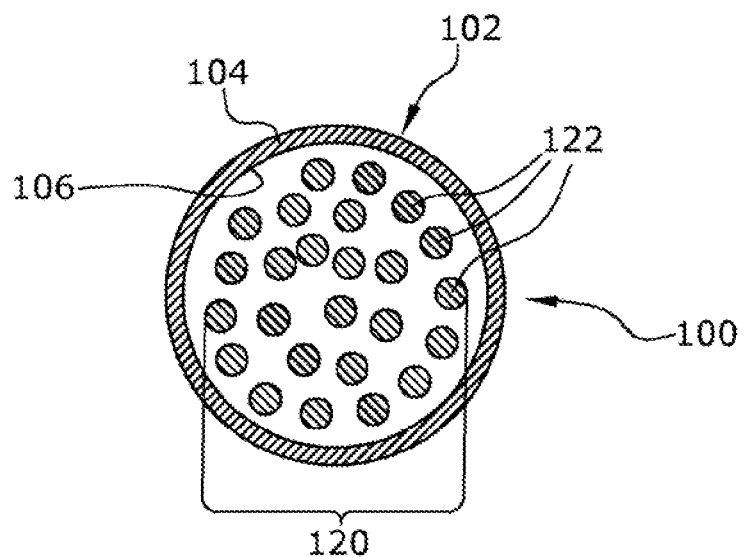

One embodiment of the invention is described with reference to the enclosed drawings, wherein FIG. 1 shows schematically an optical measurement apparatus defining a nephelometric turbidimeter with a drying circuit comprising a mechanical water stop means, FIG. 2 shows a disposable drying cartridge being a part of the drying circuit of the optical measurement apparatus of FIG. 1 and comprising the mechanical water stop means, FIG. 3 shows the non-activated mechanical water stop means of FIG. 2 in more detail, FIG. 4 shows the activated mechanical water stop means of FIG. 2, and FIG. 5 shows the cross section V-V of the mechanical water stop means of FIG. 3.

FIG. 1 shows schematically an optical measurement apparatus 10 realized as a nephelometric turbidimeter for measuring the turbidity of a liquid sample 13 in a transparent and cylindrical liquid sample vessel 12, a so-called cuvette, preferably made out of glass. The present embodiment of the measurement apparatus 10 is a so-called process device but not a so-called laboratory device although the embodiments described herein are also applicable to high-humidity lab devices.

The measurement apparatus 10 is provided with a sample transport arrangement comprising a sample inlet 8 and a sample outlet 9 at the liquid sample vessel 12. The liquid sample 13 is continuously or non-continuously pumped through the liquid sample vessel 12 to continuously or non-continuously exchange the liquid sample 13 in the liquid sample vessel 12.

The turbidity of a liquid is an indication of the concentration of solid particles suspended in the liquid sample 13. The turbidity is determined by projecting a measurement light beam 21 emitted by a light source 18 into the liquid sample 13 and by measuring the light intensity of the light scattered by the liquid sample 13 at an angle of 90° with respect to the measurement light beam's 21 longitudinal axis within the liquid sample 13. The turbidimeter 10 is provided with a ring-like optical element 20 which is a ring-prism directing the collected scattered light to an optical turbidity sensor 22 which is circular in shape and arranged coaxially to the light beam.

The optical measurement apparatus 10 is provided with a vessel chamber 16 defined by a cup-like and transparent vessel chamber housing 14 and a vessel chamber cover 11. The chamber cover 11 holds the liquid sample vessel 12 which is mounted to the chamber cover 11 by a threaded fixation ring 66. The vessel chamber housing 14 is provided with a plane and transparent bottom wall 80 defining a central optical window 19 which is transmissive for the measurement beam 21. The bottom wall 80 is also provided with numerous vessel chamber air inlet openings 38 which are arranged around the central optical window 19.

All vessel chamber air inlet openings 38 are covered and optically closed by an inlet membrane 40, respectively. The inlet membrane 40 can be a membrane made of black-colored PTFE such as, for example, GORE-TEX™ and is permeable for air and is impermeable for liquid water. At the top of the vessel chamber housing 14 a lateral vessel chamber outlet opening 42 is provided through which drying air flows out of the vessel chamber 16. The vessel chamber outlet opening 42 is provided with an outlet membrane 44 which can be a coarse filter, but also can be a PTFE membrane.

Outside the vessel chamber housing 14 an optical condensation sensor 52 is provided comprising a light emitter 56 and a light detector 54 both orientated to the outside surface 15 of the cylindrical portion of the sample vessel 12.

The vessel chamber housing 14 is enclosed by a cup-shaped optics chamber housing 26 defining a cup-shaped optics chamber 27 between the optics chamber housing 26 and the vessel chamber housing 14. The measurement light source 18, the ring-like optic element 20, the turbidity sensor 22 and the condensation sensor 52 are arranged within the optics chamber 27. In an upper portion 62 of the optics chamber 27 a passive drying means 60 is arranged. The passive drying means 60 is defined by several cushions of silica gel as a drying substance 64.

The measurement apparatus 10 is provided with a drying circuit circulating drying air for venting the sample vessel 12 to avoid condensation at the sample vessel 12 and the optic elements. The drying circuit between the vessel chamber outlet opening 42 and an optics chamber inlet opening 28 of the optics chamber housing 26 comprises an air circulator 49 and a drying cartridge 30. The air circulator 49 is a drying air pump 48, e.g. a membrane pump, driven by an electric pump motor 90 comprising a motor current sensor 92. The drying cartridge 30 comprises a drying body 32 defined by a drying substance 34 which is a molecular sieve and also comprises a mechanical water stop means 100. The drying circuit also comprises a humidity sensor 46 and a temperature sensor 47 which can be realized as one single sensor array.

The optical measurement apparatus 10 is provided with a control device 50 which electronically and electrically reads and controls the sensors 46,47,92 the drying air pump 48, the light source 18, the condensation sensor 52 and the turbidity sensor 22.

The drying cartridge 30 is shown in more detail in FIG. 2. The drying cartridge 30 is provided with a U-shaped cartridge housing 37 defining two substantially parallel legs 71, 72 and a cross portion 70 connecting the legs 71, 72. The cartridge housing legs 71, 72 lie in a horizontal plane whereas the cross portion 70 is orientated vertically.

The drying cartridge 30 also comprises a water stop means 100 and an outlet tube 74 with an internal inlet opening at the end portion of the top leg 71 and with a coupling element 33 outside the cartridge housing 37. The outlet tube 74 is also provided with a dust filter 35. In this embodiment the water stop means 100 is fluidically arranged in the course of the drying circuit and is physically integral with the drying cartridge 30. This arrangement is for convenience only, and alternatively the water stop means may be physically separate yet still within the drying circuit. This separate embodiment is not shown in the figures but one of ordinary skill will appreciate that it is an equivalent functionally.

The water stop means 100 comprises a relatively stiff plastic conduit body 100 holding a water-absorbing swelling element 120 arranged within the conduit body 102. The upstream end of the water stop means 100 is provided with a coupling structure 31 for coupling the respective air conduit coming from the pump outlet of the air pump 48. The coupling structure 31 is provided by a separate adapter element comprising an inlet opening 108 and being inserted into the inlet opening 109 of the conduit body 102. The conduit body 102 is defined by a cylindrical conduit tube 104 defining a cylindrical inside surface 106.

The swelling element 120 comprises a bundle of numerous polymer swelling filaments 122 consisting of a super absorbent material as, for example, spun super absorbent 'Ultrablock S' of Coats plc, UK. The fixed filament ends of the filament bundle are clamped in a ring slit 110 between the outer surface of a fixation ring 112 and the inner surface 106 of the conduit tube 104. The fixation ring 112 is inserted into the downstream end of the conduit body 102 to thereby clamp the swelling filaments 122. The circular opening of the fixation ring 112 defines the outlet opening 111 of the water stop means 100.

The general flow direction 114 is directed against the free ends 123 of the swelling filaments 122 which are generally orientated parallel with the longitudinal axis of the conduit body 102 and with the general flow direction 114. The swelling filaments 122 are stiff enough to remain in a generally longitudinal form and to not collapse as long as only air is flowing through the water stop means 100. As can be seen in FIG. 5, the swelling filaments 122 cover about 20 to 30% of the total cross-sectional area of the conduit tube 104.

If the liquid sample vessel 12 or any other means within the liquid vessel chamber 16 becomes leaky or damaged, the sample liquid pumped into the liquid sample vessel 12 with an over pressure of up to 3.0 bar quickly fills the vessel chamber 16 so that the sample liquid is sucked through the vessel chamber outlet opening 42 by the pump 48 to the water stop means 100. As soon as the water arrives at the swelling element 120, the filaments absorb water and thereby rapidly expand to a multiple of their dry volume. The flow resistance thereby also increases dramatically so that the swelling filaments 122 collapse to define the activated swelling element 120' as shown in FIG. 4. The activated swelling element 120' thereby completely blocks the conduit body 102 so that the drying circuit is completely blocked and no more sample liquid can arrive at the optics chamber 27.

As soon as the swelling element 120 is activated and is blocking the drying circuit, the motor current sensed by the motor current sensor 92 dramatically increases which is noticed by the control device 50 which emits a water stop signal as soon as the sensed motor current IM exceeds a set motor current value IS. The control device 50 then immediately stops the electric drying gas pump 49.

The activated water stop means 100 simply can be substituted by substituting the used drying cartridge 30 with a new drying cartridge.

The control device 50 is provided with an electronic memory wherein a humidity set value H and/or a relative humidity set value RH is memorized. The control device controls the activity of the drying pump 48 dependent on the humidity value h and the temperature value t detected by the humidity sensor 46 and the temperature sensor 47 to keep the humidity at the respective set value H,RH. The control device 50 periodically stops the humidity control to perform a calibration cycle. The calibration cycle starts with stopping the drying pump 48 so that the temperature of the air inside the vessel chamber 16 is adapted to the temperature of the sample 13. If, before the temperature adaption, the sample 13 is much colder than the air in the vessel chamber 16, condensation at the outside surface 15 of the sample vessel 12 will appear after a while. The condensation sensor 52 detects the condensation and the condensation detection is registered by the control device 50. The time t between stopping the driving pump 48 and the detection of condensation is the condensation duration d. The control device 50 now activates the drying pump 48 to pump a small air volume from the vessel chamber 16 to the sensors 46,47 to immediately determine the humidity h and the temperature t of this air volume. The control device 50 then calculates a new air humidity set value H or relative air humidity set value RH on the basis of the condensation duration, the air temperature t and the air humidity h just measured. The calculation of the new set values can be based on a mathematic function or can be based on the use of a complex look-up table.

The control device 50 then continues to control the air humidity or the relative air humidity on the basis of the new set value H,RH.

The invention claimed is:

1. An optical measurement apparatus with an optical device and a liquid sample vessel for measuring an optical parameter of a liquid sample in the liquid sample vessel, comprising
   a drying circuit circulating drying air for venting the sample vessel,
   wherein the drying circuit comprises a mechanical water stop in the course of the drying circuit, the water stop comprising a conduit body with a water-absorbing swelling element arranged within the conduit body.

2. The optical measurement apparatus of claim 1, wherein the swelling element comprises a super absorbent material.

3. The optical measurement apparatus of claim 1, wherein the swelling element comprises swelling filaments consisting of or coated with a super absorbent material.

4. The optical measurement apparatus of claim 1, wherein the super absorbent material is a super absorbent polymer.

5. The optical measurement apparatus of claim 1, wherein the water stop conduit body has an air inlet and an air outlet defining a general flow direction and the swelling filaments are fixed with their first filament ends at the conduit body so as to extend with their non-fixed second filament ends in upstream direction against the general flow direction.

6. The optical measurement apparatus of claim 1, wherein the water stop conduit body is a cylindrical tube and the swelling filaments are orientated longitudinally within the cylindrical tube.

7. The optical measurement apparatus of claim 1, total cross-sectional area of all swelling filaments covers at least 10%, and preferably at least 20% of the total cross-sectional area of the tube.

8. The optical measurement apparatus of claim 1, wherein the drying circuit comprises a disposable drying cartridge with a cartridge housing, a drying substance within the cartridge housing, fluidic coupling elements and the water stop integrated in the drying cartridge.

9. The optical measurement apparatus of claim 1, wherein the drying circuit comprises an electric drying gas pump comprising an electric pump motor, a motor current sensor sensing the electric current of the pump motor and a control device being connected with the motor current sensor, the control device emitting a water stop signal if the sensed motor current IM exceeds a set current value IS.

10. The optical measurement apparatus of claim 1, wherein the liquid sample vessel is a transparent cuvette and is provided with a sample inlet and a sample outlet.

11. The optical measurement apparatus claim 1, wherein the optical device comprises a light source and a light detector.

12. The optical measurement apparatus of claim 1, wherein the optical measurement apparatus is a nephelometric turbidimeter for measuring the turbidity of the liquid sample.

13. The optical measurement apparatus of claim 1, wherein the drying circuit comprises a disposable drying cartridge with a cartridge housing, a drying substance within the cartridge housing, fluidic coupling elements and the water stop physically separate from but in gaseous communication with the drying cartridge.

* * * * *